United States Patent [19]

Yamada et al.

[11] Patent Number: 4,657,734
[45] Date of Patent: Apr. 14, 1987

[54] METHOD FOR PREPARING A SLIDING FACE OF A MACHINE TOOL

[75] Inventors: Hiroyasu Yamada, Kawagoe; Motoatsu Shiraishi, Sakado, both of Japan

[73] Assignee: Honda Giken Kogyo Kabushiki Kaisha, Tokyo, Japan

[21] Appl. No.: 723,675

[22] Filed: Apr. 16, 1985

[30] Foreign Application Priority Data

Apr. 17, 1984 [JP] Japan ................................. 59-77119

[51] Int. Cl.⁴ .............................................. B22F 7/00
[52] U.S. Cl. ......................................... 419/9; 419/30; 419/32; 419/36; 419/60; 156/242; 156/246
[58] Field of Search ................... 419/9, 30, 36, 32, 60; 156/242, 246

[56] References Cited

U.S. PATENT DOCUMENTS 3,983,615 10/1976 Morishita ............................... 419/10
4,000,980 1/1977 Morishita et al. ..................... 419/12
4,218,494 8/1980 Belmondo et al. ................... 419/18
4,391,772 7/1983 Bonnor et al. ........................ 419/36
4,563,329 1/1986 Morishita et al. ..................... 419/9

Primary Examiner—Stephen J. Lechert, Jr.
Attorney, Agent, or Firm—Armstrong, Nikaido, Marmelstein & Kubovcik

[57] ABSTRACT

A method for preparing a sliding face of a machine tool, comprising the steps of: providing a flat surface as a slide surface to a slide component of a machine proper by gluing a plastic material prepared from a kneaded mixture of sintered metal powder and a synthetic resin binder to the slide component; and thermally dissolving out said synthetic resin binder contained in the plastic material and sintering said metal powder.

21 Claims, 3 Drawing Figures

METHOD FOR PREPARING A SLIDING FACE OF A MACHINE TOOL

BACKGROUND OF THE INVENTION

This invention relates to a method for preparing a sliding face of a machine tool.

Heretofore, it has been common practice to divide a machine tool into a machine proper and a sliding component when the sliding face is at such a location that its working is difficult, to form the sliding face on the sliding component by grinding, to effect conformation grinding to the sliding component and the machine proper, and then to attach the sliding component to the machine proper.

Dividing a machine tool in the above manner not only increases the number of parts but also requires highly accurate processing between the machine proper and the sliding component. Moreover, grinding the sliding component is a slow process; consequently, machine tool production costs are increased.

SUMMARY OF THE INVENTION

In view of foregoing, an object of the present invention is to provide a method for readily preparing a sliding face of a machine tool even when the tool is not divided into parts, to reduce production costs.

In the present invention, the method of preparing a sliding face of a machine tool comprises the steps of: providing a flat surface as a slide surface to a slide component of a machine proper by gluing a plastic material prepared from a kneaded mixture of sintered metal powder and a synthetic resin binder to the slide component; and thermally dissolving out said synthetic resin binder contained in the plastic material and sintering said metal powder.

Preparing a sliding face by gluing plastic material and sintering metal powder contained in the plastic material makes it possible to readily form the slide face intended for any part of the machine tool so that the machine tool need not be divided into parts.

DESCRIPTION OF THE PREFERRED EMBODIMENT

Figure 1:
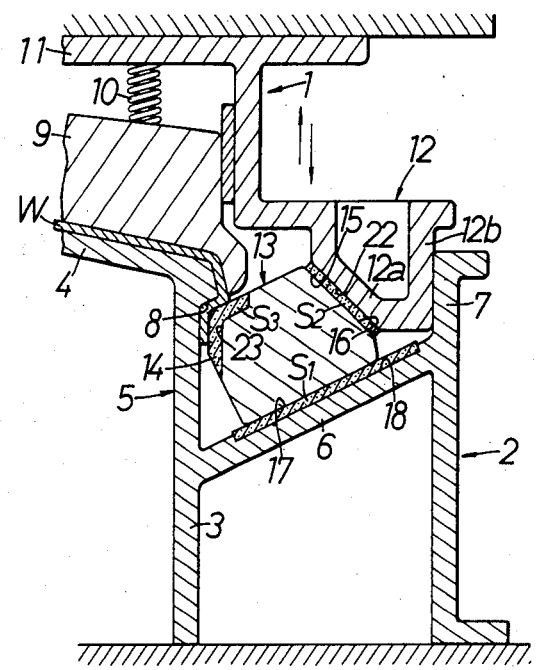
FIG. 1 is a cross sectional view of a press to which one embodiment of the present invention is applied.

FIG. 1 shows a bending press as a machine tool. The machine proper is equipped with a vertically movable upper die 1 and a lower die 2 installed opposite the upper die. The lower die 2 comprises a die proper 5 having a side wall 3 and a workpiece mount 4 coupled to the upper end of the wall, a sliding component 6 for a cam sliding, provided diagonally upward and formed integral with the outer periphery of the side wall 3 and a cam driving guide 7 coupled to the upper edge of the slide component 6. A bending recess 8 is provided in the surface of a connection between the side wall 3 and the workpiece mount 4. The upper die 1 is provided with a support 11 for suspending a workpiece pressing member 9 through a spring 10 and a cam driver 12 formed integral with the support 11. A cam slide 13 is slidably mounted on the component 6 of the lower die 2 and a forming blade 14 for bending the workpiece in cooperation with the bending recess 8 of the lower die 2 is provided on the front surface of the cam slide 13. The cam slide 13 is biased in a direction away from the recess 8 by a spring (not shown). A tilted cam face 16 is formed on the back of the cam slide 13. A tilted cam face 15 of the front slide unit 12a and the rear slide unit 12b of the cam driver 12 are allowed to come into sliding contact with the tilted cam face 16 and the guide 7.

At the time of bending, when the upper die 1 is lowered, the workpiece pressing member 9 presses a workpiece W against the workpiece mount 4 first and subsequently the tilted cam face 15 of the cam driver 12 moves the workpiece W while it comes into sliding contact with the tilted cam face 16 of the cam slide 13, causing the periphery of the workpiece W to be formed into conformance with the forming recess 8 and the forming blade 14.

The tilted slide face 17 of the slide component 6 of the lower die 2 and the tilted cam face 15 as the slide face of the cam driver 12 are prepared in the following manner:

i. Production of plastic material:

80 parts of Ni self-fluxing alloy powder and 20 parts of Mo pulverized powder are fully blended by a V-blender to obtain mixed powder.

Ethylene tetrafluoride resin emulsion and acryl resin emulsion are blended in a 1:1 ratio to obtain a plastic binder.

3 parts of the plastic binder are added to 100 parts of the above mixture, which is thoroughly kneaded on a table kneader and the kneaded material is heated at a temperature of 100°–150° C. to evaporate the moisture in the plastic binder. The kneaded material obtained is formed like masses bonded by the plastic binder.

The kneaded material is heated at a temperature of 80°–100° C. before being passed through a roll several times to obtain a plastic sheet. In this case, if the roller is heated to a temperature as high as that for the kneaded material, forming of the sheet will be facilitated. The plastic sheet obtained has proper flexibility and tear strength at ambient temperatures.

ii. Preparation of the tilted slide face of the slide unit for cam sliding.

Figure 2:
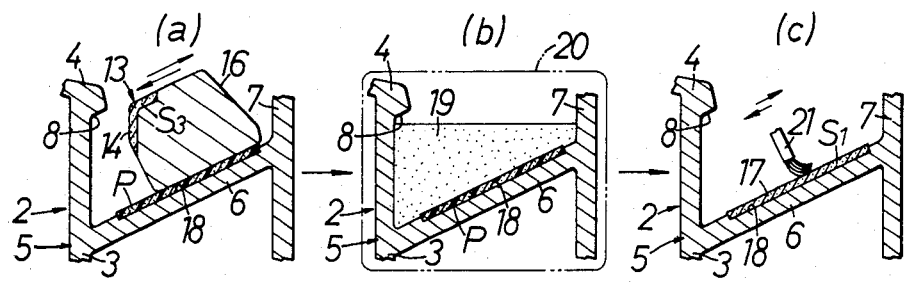
FIGS. 2(a) through (c) are block diagrams descriptive of the process of preparing a sliding face.

As shown in FIG. 2(a), the lower die 2 is prepared from cast iron (JIS FC 30) through casting and recesses 18 are made on virtually the entire area of the surface of the slide component 6. After the recesses 18 have been cleaned, acryl resin adhesives are applied thereto.

The plastic sheet thus obtained as described in (i) above is glued to the recesses 18. In this case, a laminated plastic sheet P is used to secure desired thickness. Moreover, the outer surface of the plastic sheet P is struck and compacted by a striking rod or the like means to obtain excellent adhesion between the recess 18 and the laminated plastic sheet P. If the slide component 6 is heated at a temperature of 80°–100° C., the adhesion of the plastic sheet P and the compacting can be facilitated.

Subsequently, the previously prepared cam slide 13 is mounted on the surface of the plastic sheet P and is slid up and down to flatten the surface of the sheet P, which is used as the tilted slide face 17.

As shown in FIG. 2(b), the surface of the sheet P is covered with ceramic powder and steel balls 19 each having a diameter of 0.75 mm are placed thereon to effect back-up. The back-up is intended to suppress the dimensional change, that is, expansion, of a sintered layer of Ni self-fluxing alloy-Mo powder at the time of sintering, as described later, by the weight of the steel balls 19.

Figure 3:
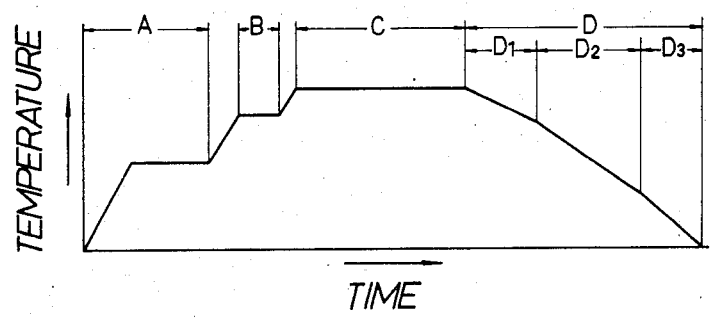
FIG. 3 is a graph indicating the relation between the sintering process and temperatures.

Then the lower die 2 is placed in a vacuum sintering furnace 20 for the dissolution of organic substances and the sintering of the metal powder in heating-cooling process conditions as shown in FIG. 3. As a carrier gas, nitrogen or highly reducible hydrogen is used.

(A) First heating zone (A in FIG. 3)

The heating zone A ranges from ambient temperatures up to 650° C., the rate of rise of temperature being 10°–20° C./min. In this heating zone, moisture first evaporates and the ethylene tetrafluoride resin and acryl resin contained in the plastic binder are melted out and gasified. Although these synthetic resins are gasified at temperatures around 300°–400° C., they are held at a constant temperature of 600°–650° C. for 90 min in view of thermal conductivity to remove almost all the organic substances therefrom, allowing the Ni self-fluxing alloy-Mo powder layer to remain. Referring to the fluctuation of vacuum degree in the vacuum sintering furnace 20, the gasification of the organic substances will be described as follows:

Although the vacuum is 1 Torr at ambient temperatures, it varies to 2 Torr when the substances are held at a constant temperature of 650° C. for 90 min. This is mainly because of the generation of decomposition gas therefrom. The vacuum again rises to 1 Torr after 90 minutes, indicating that the gas resulting from dissolution has been removed from the vacuum sintering furnace 20.

(B) Second heating zone (B in FIG. 3)

The temperature in this heating zone ranges from 900° to 1,000° C. and the Ni self-fluxing alloy-Mo powder layer is subjected to a solid phase sintering process at a temperature below the solid phase line of the Ni self-fluxing alloy (1,010°–1,020° C.), for instance, a constant temperature of 950° C. for 30 min for temporarily sintering the layer. The rate of temperature rise from the first heating zone A is 10°–20° C./min.

Since the Ni self-fluxing alloy-Mo powder layer in the vacuum sintering furnace 20 is heated from its surface first, a predetermined heating period is required until the whole layer has a uniform temperature. If the Ni self-fluxing alloy-Mo powder layer is directly heated at sintering temperatures of 1,000°–1,200° C. a temperature difference will occur between its surface and the portion in contact with the recesses 18, causing the porosity to further vary, thereby preventing the formation of a uniform sintered layer. As a result, flaws such as cracking after sintering will readily occur.

In the second heating zone B, organic substances that have not been decomposed are completely gasified and removed. Due to this gasification, the vacuum in the vacuum sintering furnace 20 is temporarily reduced to 4 Torr but restored to 1 Torr 30 minutes later.

(C) Third heating zone (C in FIG. 3)

This heating zone C corresponds to temperatures right under the solid phase line (1,010°–1,020° C.) of the Ni self-fluxing alloy up to that exceeding the liquid phase line (1,075°–1,085° C.), that is 1,000°–1,200° C., wherein the temporarily sintered layer of Ni self-fluxing alloy-Mo is held at, for instance, 1,100°–1,180° C., that is, the temperature exceeding the liquid phase line, preferably at 1,120° C. constantly for 120 min to apply the liquid sintering process using the fusion of Ni self-fluxing alloy so as to form a sintering layer $S_1$. In this case, the flow of the Ni self-fluxing alloy is prevented by the presence of Mo and thus an ideal shape can be maintained. The rate of temperature rise from the second heating zone B is 15°–20° C./min and, as the temporarily sintered layer of Ni self-fluxing alloy-Mo has already been heated to a high temperature in the second heating zone B, the temperature rise time up to the third heating zone C is negligible. If the holding time in the third heating zone C is insufficient, sintering will be unsatisfactory and flaws will occur in the sintered layer $S_1$.

The reason for selecting a sintering temperature of 1,120° C. is that this is below the eutectic temperature of the lower die 2 made of cast iron.

(D) Cooling zone (D in FIG. 3)

The cooling zone D is divided into a first cooling zone $D_1$ roughly ranging from the mentioned sintering temperature to about 800° C., a second cooling zone $D_2$ from about 800° C. down to about 400° C. and a third cooling zone $D_3$ from about 400° C. to ambient temperatures.

The first cooling zone $D_1$ is a stable one for the sintered layer $S_1$ under high temperatures and any thermal impulse should be avoided as far as is possible. At the same time, the layer is cooled at a low rate of 2° C./min maximum to insure stable cooling. If the sintered layer $S_1$ is cooled rapidly in this zone $D_1$, cracking may often occur.

In the second cooling zone $D_2$, the layer is cooled at a low rate of 3° C./min maximum so as to absorb dimensional changes due to the linear expansion $(12.5 \times 10^{-6}/°C.)$ and $Ar_1$ deformation of the lower die 2. In this case, although the linear contraction of the sintered layer is $14.6 \times 10^{-6}/°C.$, its contraction follows that of the lower die 2 because the former is porous. If the sintered layer $S_1$ is cooled rapidly in this cooling zone $D_2$, cracking may occur frequently.

In the third cooling zone $D_3$, the sintered layer $S_1$ and the lower die 2 are cooled down to ambient temperatures with gas (including air cooling) with water or oil.

The above sintered layer $S_1$ offers excellent deposition properties to the recesses 18 and is free from flaws such as cracking and has an accuracy of $\pm 0 \sim +2$ mm or less in terms of dimensional change. Its surface is flat and provided with sufficient properties for use as the tilted slide face 17.

As shown in FIG. 2(c), ethylene tetrafluoride dispersed as a lubricating synthetic resin is applied to the surface of the sintered layer $S_1$ with a brush 21 to facilitate impregnation and hardening so as to fill pin holes in the sintered layer $S_1$ with the resin and improve lubricating characteristics of the tilted slide face 17.

The aforementioned impregnation by means of the lubricating resin may be made by vacuum impregnation. Moreover, solid lubricating material such as $WS_2$, $MoS_2$ may be mixed with the plastic material when it is prepared and the sintered layer $S_1$ may be allowed to contain the solid lubricating material. In this case, if the sintered layer $S_1$ obtained is impregnated and hardened with the lubricating resin, lubricating characteristics will be further imporved.

The tilted cam face 15 of the cam driver 12 and the forming blade 14 of the cam slide 13 are also composed of sintered layers $S_2$, $S_3$ obtained through the same process above.

When the tilted cam face 15 is made flat, the plastic material is glued to the front slide unit 12a of the cam driver 12, and the plastic material is then pressed against the tilted cam face 16 of the cam slide 13. When the forming blade 14 is formed, the plastic material is glued to the recess 23 of the cam slide 13 and the plastic material is then pressed against the bending recess 8 of the lower die 2 via a flexible sheet of material of the same thickness as that of the workpiece W. To improve the durability of the forming blade 14 of the cam slide 13, super hard metal powder such as WC may be mixed with the metal powder contained in the plastic material as a component.

The present invention may be applicable not only to press slide faces and but also to other machine tools.

According to the present invention, as plastic material is glued to the machine proper and the metal powder contained in the plastic material is sintered thereby to form a slide face, the slide face can be readily formed on any portion of a machine tool in a short while. Accordingly, it is unnecessary to construct a machine tool of divided parts. It is possible to solve every problem associated with the dividing method, thereby reducing production costs.

What is claimed is:

1. A method of preparing a sliding face of a machine tool comprising the steps of:
   preparing a plastic material by kneading together a metal powder capable of being sintered and a synthetic resin binder;
   glueing the plastic material to a slide surface of a slide component of the machine tool;
   flattening an external surface of the plastic material;
   applying a back up to the external surface of the plastic material to supress dimensional change;
   heating the slide component with the plastic material on the slide surface thereof to thermally dissolve out the synthetic resin binder; and
   further heating the slide component to sinter the metal powder in place.

2. A method as defined in claim 1, wherein said metal powder is obtained by blending 80 parts of Ni self-fluxing alloy powder and 20 parts of Mo pulverized powder.

3. A method as defined in claim 2, wherein said blending is performed by means of a V-blender.

4. A method as defined in claim 1, wherein said synthetic resin binder is obtained by blending ethylene tetrafluoride resin emulsion and acryl resin emulsion in a 1:1 ratio.

5. A method as defined in claim 1, 2, 3 or 4, wherein said plastic material is prepared by adding 3 parts of said synthetic resin beinder to 100 parts of said metal powder and kneading them together.

6. A method as defined in claim 1, further comprising the steps of:
   after preparing a kneaded material from said metal powder and said synthetic resin binder, heating the kneaded material at a temperature of 100°–150° C. to evaporate moisture contained in the binder; and
   thereafter further heating the material at a temperature of 80°–100° C. to obtain said plastic material.

7. A method as defined in claim 5, further comprising the steps of:
   after preparing a kneaded material from said metal powder and said synthetic resin binder, heating the kneaded material at a temperature of 100°–150° C. to evaporate moisture contained in the binder; and
   thereafter further heating the material at a temperature of 80°–100° C. to obtain said plastic material.

8. A method as defined in claim 1, wherein said plastic material is obtained in a sheet form.

9. A method as defined in claim 1, further comprising the step of applying an adhesive agent to said slide surface of the slide component before glueing said plastic material to the slide surface.

10. A method as defined in claim 8, wherein a Plurality of said sheet-formed plastic materials are applied in laminated manner to said slide surface for obtaining a desired thickness.

11. A method as defined in claims 1, 8, 9 or 10, wherein an outer surface of the plastic material is struck and compacted by a means such as a striking rod.

12. A method as defined in claim 1, wherein the backup applied to the external surface of the plastic material is provided by the steps of covering the external surface of the plastic material with ceramic powder and placing steel balls thereon to effect the back-up before said plastic material is subjected to heating process.

13. A method as defined in claim 1, wherein heating of the plastic material is carried out in a plurality of separate steps and its heating temperature is finally raised up to a level exceeding a liquid phase line of said metal powder, and thereafter the plastic material is subjected to cooling process consisting of a plurality of separate steps.

14. A method as defined in claim 13, wherein a maximum heating temperature in the heating process is set to be below an eutectic temperature of said slide component.

15. A method as defined in claim 13, wherein said cooling process is conducted slowly so as not to cause cracking in a sintered layer obtained by sintering of said metal powder.

16. A method as defined in claim 1, further comprising the step of applying a lubricating synthetic resin to a surface of a sintered layer which is obtained by sintering said metal powder, thereby effecting impregnation and hardening.

17. A method as defined in claim 16, wherein ethylene tetrafluoride dispersed is used as said lubricating synthetic resin.

18. A method as defined in claims 16 or 17, wherein a solid lubricating material is mixed with the plastic material at the time of preparation of the latter.

19. A method as defined in claim 1, wherein said machine tool is a bending press including an upper die and a lower die.

20. A method as defined in claim 19, wherein said slide component is the lower die of the bending press and said lower die is placed in a sintering furnace and subjected to the heating and sintering processes.

21. A method as defined in claim 20, wherein said lower die is placed in said furnace without being disassembled into parts.

* * * * *